United States Patent
Tanaka

(10) Patent No.: US 11,683,823 B2
(45) Date of Patent: Jun. 20, 2023

(54) CONTROL DEVICE AND CONTROL METHOD

(71) Applicant: FUJITSU LIMITED, Kawasaki (JP)

(72) Inventor: Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 136 days.

(21) Appl. No.: 17/186,029

(22) Filed: Feb. 26, 2021

(65) Prior Publication Data

US 2021/0274508 A1 Sep. 2, 2021

(30) Foreign Application Priority Data

Mar. 2, 2020 (JP) .............................. JP2020-034858
Nov. 27, 2020 (JP) .............................. JP2020-197390

(51) Int. Cl.
*H04W 72/541* (2023.01)
*H04W 24/10* (2009.01)

(52) U.S. Cl.
CPC ......... *H04W 72/541* (2023.01); *H04W 24/10* (2013.01)

(58) Field of Classification Search
CPC ... H04W 72/082; H04W 24/10; H04W 28/24; H04W 16/10

(Continued)

(56) References Cited

U.S. PATENT DOCUMENTS

| | | | | |
|---|---|---|---|---|
| 5,442,804 A | * | 8/1995 | Gunmar | H04W 16/18 455/67.11 |
| 2011/0125905 A1 | * | 5/2011 | Baucke | H04W 4/24 709/226 |

(Continued)

FOREIGN PATENT DOCUMENTS

| | | | | |
|---|---|---|---|---|
| CN | 106714093 A | * | 5/2017 | ............ H04W 16/10 |
| CN | 107071782 B | * | 3/2020 | ............ H04W 16/04 |

(Continued)

OTHER PUBLICATIONS

F. Bahlke, O. D. Ramos-Cantor, S. Henneberger and M. Pesavento, "Optimized Cell Planning for Network Slicing in Heterogeneous Wireless Communication Networks," in IEEE Communications Letters, vol. 22, No. 8, pp. 1676-1679, Aug. 2018, doi: 10.1109/LCOMM.2018.2841866. (Year: 2018).*

(Continued)

*Primary Examiner* — Hassan Kizou
*Assistant Examiner* — Oladiran Gideon Olaleye
(74) *Attorney, Agent, or Firm* — Fujitsu Patent Center

(57) ABSTRACT

A control device in a communication system including base station devices and terminal devices includes a processor configured to: calculate a needed radio resource amount of each slice classified based on requested quality; estimate an amount of interference between the base station devices, an amount of interference between the base station devices and the terminal devices, and an amount of interference between the terminal devices; allocate, in radio resources of a first base station device, a first resource for a first slice, a second resource for a second slice, and a restricted resource to which restrictions are imposed on use, based on a result of the estimation; and allocate a resource other than the second resource and the restricted resource as the first resource, and allocates a resource that is allocated in a second base station device and has influence on interference with the second slice.

10 Claims, 13 Drawing Sheets

(58) Field of Classification Search
USPC .......................................................... 370/252
See application file for complete search history.

(56) References Cited

U.S. PATENT DOCUMENTS

| | | | | |
|---|---|---|---|---|
| 2011/0183679 | A1* | 7/2011 | Moon | H04W 72/082 |
| | | | | 455/450 |
| 2011/0280330 | A1* | 11/2011 | Tanaka | H04W 72/0426 |
| | | | | 375/267 |
| 2012/0115529 | A1* | 5/2012 | Sun | H04W 24/10 |
| | | | | 455/517 |
| 2013/0310058 | A1 | 11/2013 | Ibrahim et al. | |
| 2015/0154258 | A1* | 6/2015 | Xiong | G06F 16/24542 |
| | | | | 707/718 |
| 2015/0195715 | A1* | 7/2015 | Nagata | H04J 11/0056 |
| | | | | 370/252 |
| 2016/0119850 | A1* | 4/2016 | Kimura | H04W 24/10 |
| | | | | 370/332 |
| 2016/0128001 | A1* | 5/2016 | Tsuda | H04W 16/32 |
| | | | | 370/329 |
| 2017/0164349 | A1 | 6/2017 | Zhu et al. | |
| 2017/0181191 | A1* | 6/2017 | Wen | H04W 74/0816 |
| 2017/0318468 | A1* | 11/2017 | Aijaz | H04W 72/0433 |
| 2018/0014222 | A1* | 1/2018 | Song | H04W 28/0268 |
| 2018/0139614 | A1* | 5/2018 | Satoh | H04J 11/005 |
| 2019/0075512 | A1* | 3/2019 | Jin | H04W 24/10 |
| 2019/0319868 | A1* | 10/2019 | Svennebring | H04L 41/147 |
| 2019/0357122 | A1* | 11/2019 | Li | H04W 48/18 |
| 2019/0364492 | A1* | 11/2019 | Azizi | H04W 52/0261 |
| 2020/0053834 | A1* | 2/2020 | Dahan | H04L 41/0816 |
| 2020/0252908 | A1* | 8/2020 | Liu | H04L 41/5025 |
| 2021/0037544 | A1* | 2/2021 | Andrews | H04L 47/808 |
| 2021/0160768 | A1* | 5/2021 | Akman | H04W 76/12 |
| 2021/0352575 | A1* | 11/2021 | Chun | H04W 72/02 |
| 2022/0167355 | A1* | 5/2022 | Andrews | H04L 47/2425 |
| 2022/0200874 | A1* | 6/2022 | Fendt | H04L 41/5006 |

FOREIGN PATENT DOCUMENTS

| | | |
|---|---|---|
| JP | 2016-077017 A | 5/2016 |
| JP | 2017-200172 A | 11/2017 |
| JP | 2018-538751 A | 12/2018 |
| JP | 2019-016875 A | 1/2019 |
| JP | 2019-021953 A | 2/2019 |
| WO | 2013/173358 A1 | 11/2013 |
| WO | 2019/111317 A1 | 6/2019 |

OTHER PUBLICATIONS

R. Kokku, R. Mahindra, H. Zhang and S. Rangarajan, "CellSlice: Cellular wireless resource slicing for active RAN sharing," 2013 Fifth International Conference on Communication Systems and Networks (COMSNETS), 2013, pp. 1-10, doi: 10.1109/COMSNETS. 2013.6465548. (Year: 2013).*

Trinh, H. Esaki and C. Aswakul, "Quality of service using careful overbooking for optimal virtual network resource allocation," The 8th Electrical Engineering/ Electronics, Computer, Telecommunications and Information Technology (ECTI) Association of Thailand—Conference 2011, 2011, pp. 296-299. (Year: 2011).*

"5G; System Architecture for the 5G System (3GPP TS 23.501 version 15.3.0 Release 15)" ETSI TS 123 501, V15.3.0, pp. 1-226, Sep. 2018 (Total 227 pages).

* cited by examiner

CONTROL DEVICE AND CONTROL METHOD

CROSS-REFERENCE TO RELATED APPLICATION

This application is based upon and claims the benefit of priority of the prior Japanese Patent Application Nos. 2020-197390, filed on Nov. 27, 2020, and 2020-34858, filed on Mar. 2, 2020, the entire contents of which are incorporated herein by reference.

FIELD

The embodiments discussed herein are related to a control device and a control method.

BACKGROUND

In recent years, local 5G, in which frequencies for 5G are allocated to other than telecommunications carriers in a limited area, has been attracting attention as an approach that allows companies or the like to independently build self-employed radio networks using 5G communication technology.

Examples of the technology relating to 5G are described in following Patent Documents: Japanese Laid-open Patent Publication No. 2019-16875, Japanese Laid-open Patent Publication No. 2016-77017, Japanese Laid-open Patent Publication No. 2017-200172, International Publication Pamphlet No. WO 2019/111317, Japanese National Publication of International Patent Application No. 2018-538751, and Japanese Laid-open Patent Publication No. 2019-021953 are disclosed as related art.

SUMMARY

According to an aspect of the embodiments, a control device in a communication system that includes a plurality of base station devices and terminal devices connected via radio to the base station devices includes a memory and a processor coupled to the memory and configured to: calculate a needed radio resource amount of each of a plurality of slices classified based on requested quality; estimate, for each of the plurality of base station devices, an amount of interference between the base station devices, an amount of interference between the base station devices and the terminal devices, and an amount of interference between the terminal devices, in each of the plurality of slices; allocate, in radio resources of a first base station device, a first resource for a first slice, a second resource for a second slice that has higher requested quality than requested quality of the first slice, and a restricted resource to which restrictions are imposed on use, based on a result of the estimation; and allocate a resource other than the second resource and the restricted resource as the first resource, and allocates a resource that is allocated in a second base station device and has influence on interference with the second slice, as the restricted resource.

The objective and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, there is a case where a company builds a local 5G environment on its premises or on premises commissioned by another owner. Hereinafter, the network operation unit in local 5G will be referred to as a tenant. In each tenant, for example, various operations for a factory that produces goods, a warehouse for distribution, and the like are conceivable. In a 5G communication network, in some cases, for example, slices are built in the core network according to the requested quality of service (QoS) of each traffic, such as the importance and urgency of data to be sent and received, and these slices are used to accommodate diverse kinds of traffic.

However, unlike public networks operated and managed by telecommunications carriers, in local 5G operated independently by individual carriers, for example, it is sometimes difficult to meet the requested quality of each slice set in the core network on the radio network side. For example, interference occurs between tenants or between cells within the same tenant in some cases. As a method of controlling interference between cells, a method of allocating different frequencies (channels) between cells that are mutually affected by interference is common, and such a method is adopted in, for example, a radio local area network (LAN). At this time, for example, when a slice having a small traffic volume but a high requested quality and a slice having a low requested quality are mixed in a certain base station device, it is assumed that control is exercised so as to allocate a frequency (channel) different from the frequencies (channels) of other base station devices having interference, to the slice having the high requested quality such that the quality of this slice can be ensured. In this case, a large number of frequency resources (number of channels) are expected, and the utilization efficiency of radio resources sometimes decreases significantly in the entire network. Meanwhile, on the contrary to this, it is assumed that control is exercised so as to allocate a frequency (channel) different from the frequencies (channels) of other base station devices having interference such that the quality of the slice having the low requested quality can be ensured. In this case, a radio resource with unacceptable interference is sometimes allocated to the slice having the high requested quality, and the requested quality of this slice is not met in some cases.

Thus, one aspect of the disclosure provides a control device and a control method that suppress a decrease in frequency utilization efficiency while meeting the requested quality of a slice made up of pieces of traffic having the same requested quality.

First Embodiment

Figure 1:
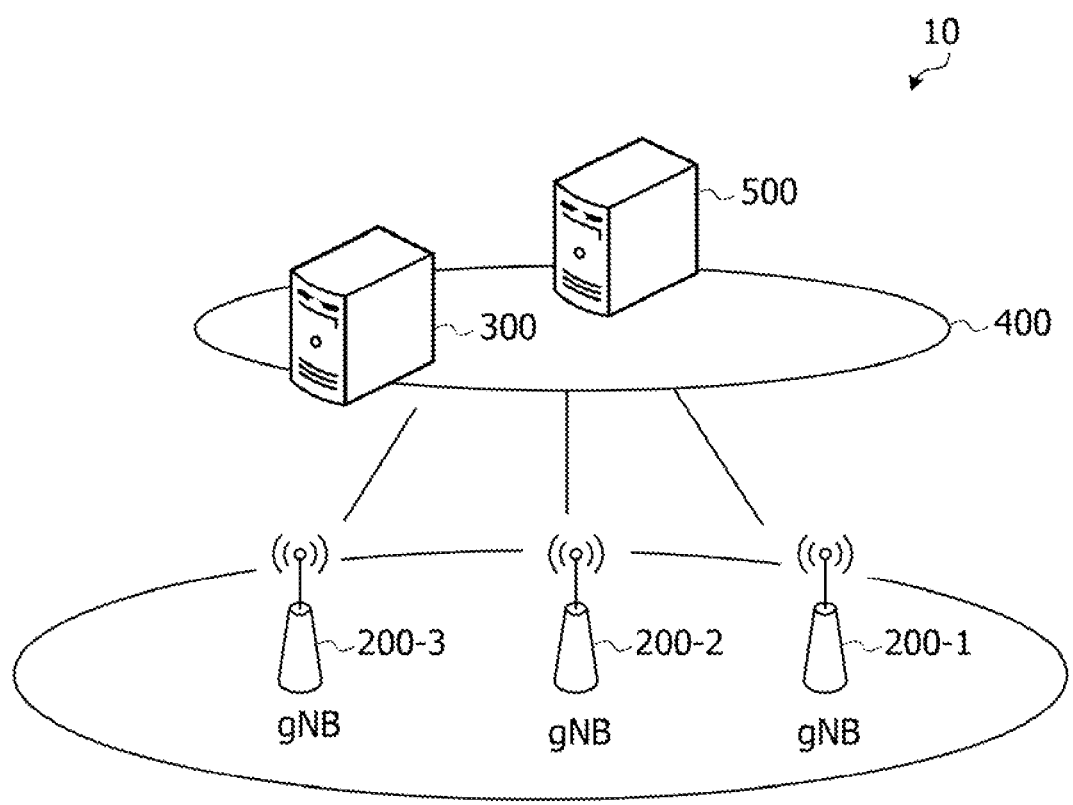
FIG. 1 is a diagram illustrating an exemplary configuration of a communication system.

A first embodiment will be described.
<Exemplary Configuration of Communication System>
FIG. 1 is a diagram illustrating an exemplary configuration of a communication system 10. The communication system 10 includes gNodeBs 200-1 to 200-3 (hereinafter, sometimes referred to as gNodeBs 200), a network management system (NMS) server 300, a core network server 500, and a core network 400. The communication system 10 is a system in which the NMS server 300 controls radio resources for each gNodeB 200 and a terminal device 100 (not illustrated).

The gNodeB 200 is a base station device that performs radio communication with the terminal device 100. The gNodeB 200 constitutes a cell, which is an area in which radio communication with the terminal device 100 is enabled. The gNodeB 200 has its radio resources controlled by the NMS server 300 via the connected core network 400. Note that the gNodeBs 200 may be base station devices in different tenants from each other, or may be base station devices in the same tenant. In addition, although the number of the gNodeBs 200 is three in FIG. 1, the number of the gNodeBs 200 may be two or less, or four or more.

The NMS server 300 is a control device that controls the entire network, which is a control device that controls the radio resources of the gNodeBs 200, and is, for example, a server machine. The NMS server 300 controls radio resources for each slice configured by the core network server 500, for example. Furthermore, the NMS server 300 controls interference between the gNodeBs 200 by controlling the radio resources of each gNodeB, for example. In addition, the NMS server 300 controls, for example, the core network 400.

The core network server 500 is a server that provides various functions in the core network 400, and is, for example, a server machine. The core network server 500 builds slices, for example, according to the requested qualities of various kinds of traffic. For example, the requested quality includes indexes of the transmission rate, the amount of latency, the reliability, and the like. For example, ultra-reliable and low latency communications (URLLC) request high reliability and low latency, although the requested transmission rate is not so high. Meanwhile, large-capacity communication is desired in enhanced mobile broadband (eMBB), but its reliability and acceptable amount of latency of eMBB are lower than those of URLLC.

The terminal device 100 (not illustrated) is a device that performs radio communication via the gNodeB 200, and is, for example, a smartphone or a tablet terminal. Furthermore, the terminal device 100 may be a device such as a manufacturing robot in a factory or a communication module attached to a production line. In addition, the terminal device 100 may be, for example, a device such as a reader device for managing products or a communication module attached to an inventory management system in a distribution system.

The communication system 10 is a system in which the NMS server 300 manages the radio resources of the gNodeBs 200 to optimize the allocation and interference of the radio resources between neighboring cells each constituted by the gNodeB 200 neighboring to another.

Figure 2:
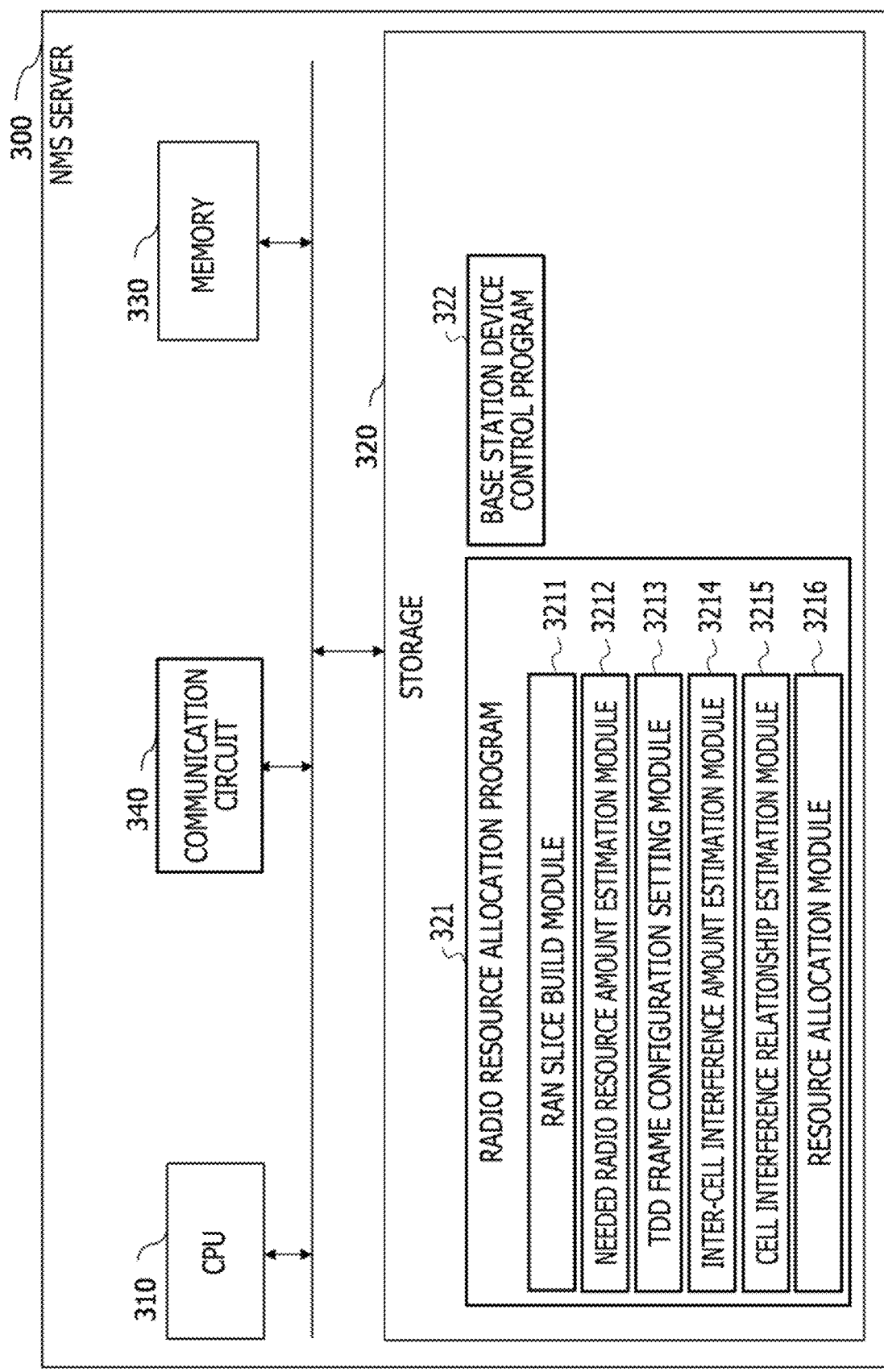
FIG. 2 is a diagram representing an exemplary configuration of a network management system (NMS) server 300.

<Exemplary Configuration of NMS Server 300>
FIG. 2 is a diagram representing an exemplary configuration of the NMS server 300. The NMS server 300 includes a central processing unit (CPU) 310, a storage 320, a memory 330, and a communication circuit 340.

The storage 320 is an auxiliary storage device that stores programs and data, such as a flash memory, a hard disk drive (HDD), or a solid state drive (SSD). The storage 320 stores a radio resource allocation program 321 and a base station device control program 322.

The memory 330 is an area in which a program stored in the storage 320 is loaded. Furthermore, the memory 330 may be used as an area in which the program stores data.

The communication circuit 340 is a circuit that connects to another device and performs communication. For example, the communication circuit 340 is a network interface card or a communication port or the like.

The CPU 310 is a processor that loads a program stored in the storage 320 into the memory 330 and executes the loaded program to build each unit and implement each process.

By executing the radio resource allocation program 321, the CPU 310 builds an estimation unit and an allocation unit, and performs a radio resource allocation process. The radio resource allocation process is a process of allocating radio resources to the connected (controlled) gNodeBs 200. In the radio resource allocation process, the NMS server 300 performs a radio access network (RAN) slice build process, a needed radio resource amount estimation process, a time division duplex (TDD) frame configuration setting process, an inter-cell interference amount estimation process, a cell interference relationship estimation process, and a resource allocation process.

The CPU 310 builds the estimation unit and the allocation unit by executing a RAN slice build module 3211 of the radio resource allocation program 321, and performs the RAN slice build process. The RAN slice build process is a process of building a RAN slice that is subdivided from slices built in the core network, according to the RAN environment. Note that, in the RAN slice build process, the NMS server 300 may treat the slice built in the core network as the RAN slice as it is.

The CPU 310 builds the estimation unit and the allocation unit by executing a needed radio resource amount estimation module 3212 of the radio resource allocation program 321, and performs the needed radio resource amount estimation process. The needed radio resource amount estimation process is a process of estimating (calculating) the expected amount of radio resources for each RAN slice.

The CPU 310 builds the estimation unit and the allocation unit by executing a TDD frame configuration setting module 3213 of the radio resource allocation program 321, and performs the TDD frame configuration setting process. The TDD frame configuration setting process is a process of determining the TDD frame configuration based on the needed radio resource amount, and setting the determined TDD frame.

The CPU 310 builds the estimation unit and the allocation unit by executing an inter-cell interference amount estimation module 3214 of the radio resource allocation program 321, and performs the inter-cell interference amount estimation process. The inter-cell interference amount estimation process is a process of estimating the amount of interference between cells for each RAN slice.

The CPU 310 builds the estimation unit and the allocation unit by executing a cell interference relationship estimation module 3215 of the radio resource allocation program 321, and performs the cell interference relationship estimation process. The cell interference relationship estimation process is a process of estimating the interference relationship between cells for each RAN slice.

The CPU 310 builds the estimation unit and the allocation unit by executing a resource allocation module 3216 of the radio resource allocation program 321, and performs the resource allocation process. The resource allocation process is a process of allocating radio resources that can meet the requested qualities of slices in order from a RAN slice having the highest priority (highest requested quality) based on the estimated interference relationship between cells.

The CPU 310 performs a base station device control process by executing the base station device control program 322. The base station device control process is a process of notifying each gNodeB 200 of the determined radio resources and causing each gNodeB 200 to execute the notified radio resources.

<Same Channel Interference Control>

Figure 3A:
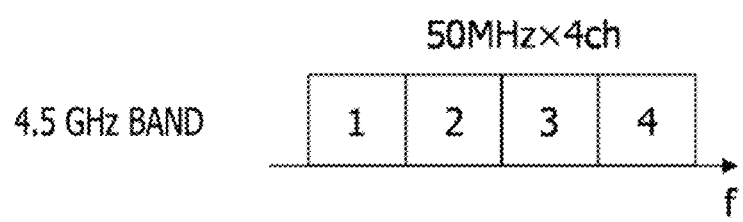
FIGS. 3A and 3B are diagrams illustrating an example of control between cells using the same channel.
Figure 3B:
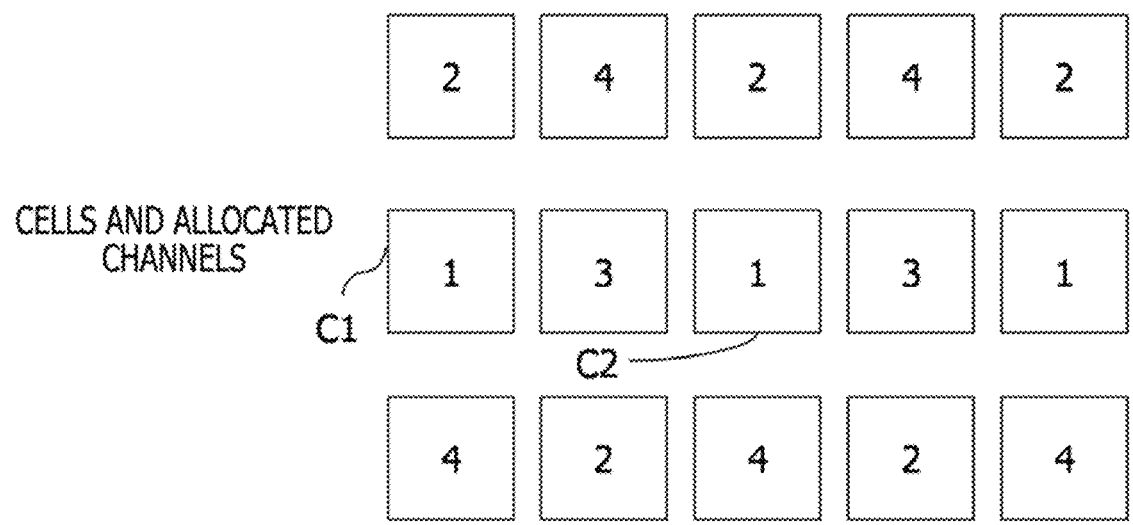

FIGS. 3A and 3B are diagrams illustrating an example of control between cells using the same channel. As illustrated in FIG. 3A, for example, if the minimum unit of allocation is assigned as 50 MHz and the 200 MHz field, which is an available band in the 4.5 GHz band, is divided, the 200 MHz field can be divided into four channels.

FIG. 3B is a diagram illustrating 15 cells and an example of the allocation of channels used by these respective cells. As illustrated in FIG. 3B, for cells adjacent to each other, channels are allocated to these respective cells such that the same channel is not used. However, for example, multiple cells that are not adjacent to each other but are allocated with the same channel 1, such as cells C1 and C2, interfere with each other in some cases. Thus, the NMS server 300 performs radio resource control between cells in consideration of diverse QoS flows (or slices) with the above minimum unit of allocation.

Figure 4:
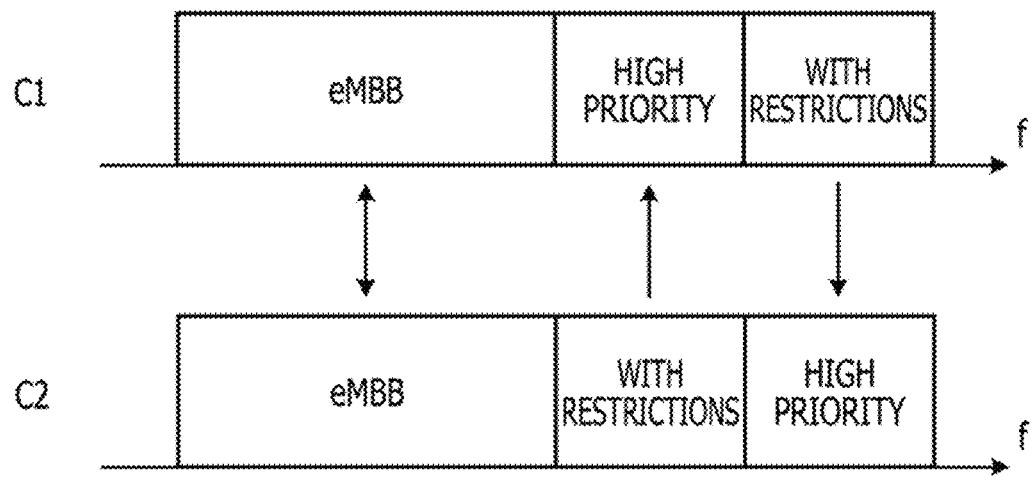
FIG. 4 is a diagram illustrating an example of radio resource allocation.

FIG. 4 is a diagram illustrating an example of radio resource allocation. FIG. 4 illustrates a mixed environment of two types of traffic having different requested qualities. One is enhanced mobile broadband (eMBB) communication whose requested quality includes high speed and large capacity. The other of the two types of traffic is ultra-reliable and low latency communications (URLLC). In factories and the like, for example, URLLC slices are sometimes used for real-time control of manufacturing devices, or the like, while eMBB slices are sometimes used for line monitoring by cameras, or the like. In this case, the highest priority is to perform real-time control of the manufacturing devices with high reliability, and in communication, the priority of the URLLC slices is set higher than the priority of the eMBB slices. Hereinafter, eMBB is assumed to have a relatively low priority compared with the URLLC slices.

As illustrated in FIG. 4, the NMS server 300 allocates the same frequency band to the cells C1 and C2 as radio resources for eMBB. Then, the NMS server 300 divides the frequency of the channel for other than the radio resources for eMBB into two, and assigns a frequency band used by the cell C1 with high priority as a frequency band with restrictions in C2, while assigning a frequency band used by the cell C2 with high priority as a frequency band with restrictions in the cell C1. Restrictions in the frequency band with restrictions indicate, for example, a state in which the use of the concerned band is prohibited. Furthermore, restrictions include a restriction for suppressing interference with the other cell, such as a limit on the sending output and a limit on the beam direction.

As illustrated in FIG. 4, when one of the cells C1 and C2 uses the radio resource for high priority use, the use of this radio resource is limited in the other cell, such that high-priority communication may be carried out on a resource with small interference with each other.

Figure 5:
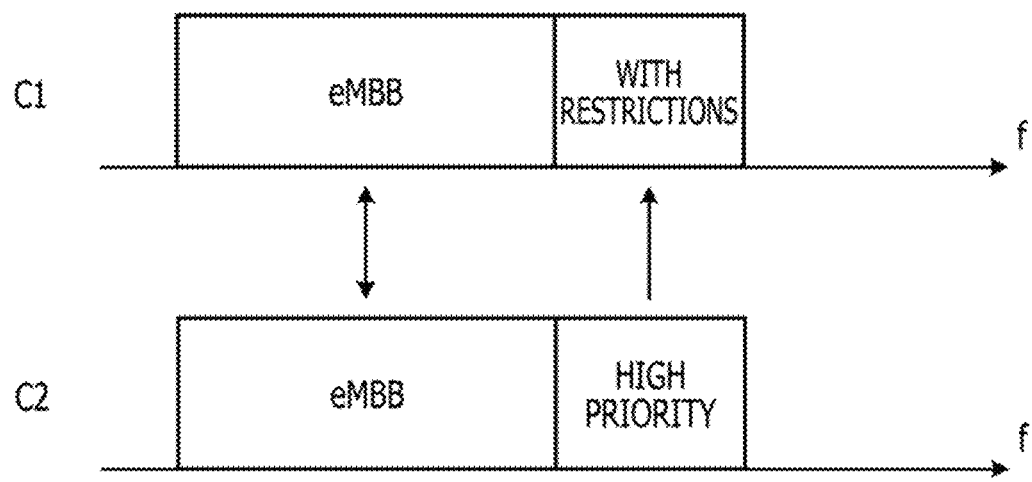
FIG. 5 is a diagram illustrating an example of radio resource allocation.

FIG. 5 is a diagram illustrating an example of radio resource allocation. As illustrated in FIG. 5, the NMS server 300 allocates the same frequency band to the cells C1 and C2 as radio resources for eMBB. Then, the NMS server 300 assigns the frequency of the channel for other than the radio resources for eMBB as a frequency band used with high priority in the cell C2, and assigns the same frequency as a frequency band with restrictions in the cell C1. For example, it is not expected for the cell to perform high-priority data communication in some cases depending on the environment in which the cell is used. For example, when high-priority data communication is not expected in the cell C1, the allocation technique as illustrated in FIG. 5 may be practical. By making the allocation in FIG. 5, an effect similar to the effect in FIG. 4 is obtained in some cases.

<Radio Resource Allocation Process>

The radio resource allocation process in the NMS server 300 will be described. When allocating radio resources, the NMS server 300 executes a radio resource allocation process S1000.

Figure 6:
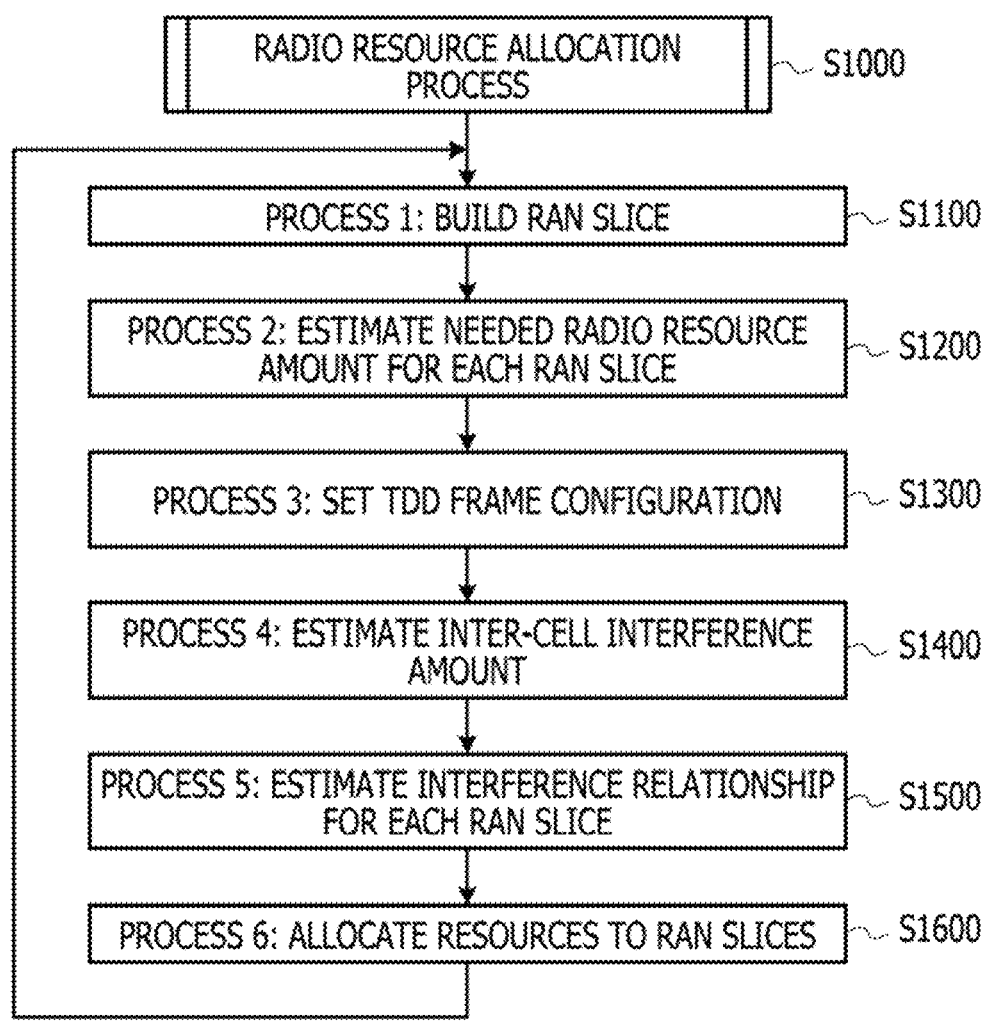
FIG. 6 is a diagram illustrating an example of a processing flowchart of a radio resource allocation process S1000.

FIG. 6 is a diagram illustrating an example of a processing flowchart of the radio resource allocation process S1000. In the radio resource allocation process S1000, the NMS server 300 builds a RAN slice in each gNodeB 200 (S1100), estimates the needed radio resource amount for each RAN slice (S1200), sets a TDD frame configuration (S1300), estimates the inter-cell interference amount (S1400), estimates the interference relationship between cells for each RAN slice (S1500), and allocates resources to the RAN slices (S1600). The NMS server 300 repeats the processes 1 to 6 in the radio resource allocation process S1000. The NMS server 300 periodically performs the radio resource allocation process S1000, for example. Each process will be described below.

<Process 1: Build of RAN Slice>

In the process 1, the NMS server 300 builds a radio access network (RAN) slice. In the process 1, the NMS server 300 builds a RAN slice further subdivided based on the characteristics of RAN from slices built in the core network based on QoS. Since the slices are subdivided based on the RAN characteristics, the allocation of more appropriate radio resources according to the RAN characteristics is enabled when radio resources are allocated to the RAN slices.

For example, the NMS server 300 builds the RAN slice based on the positional relationship of the terminal device 100 with the gNodeB 200 in the cell. The positional relationship includes, for example, the distance between the gNodeB 200 and the terminal device 100 during communication. The NMS server 300 subdivides slices with the same QoS, for example, into a RAN slice made up of traffic of the terminal device 100 located at a cell end (near an end part of the cell) and a RAN slice made up of traffic of the other terminal device 100. With this configuration, the NMS server 300 is allowed to make allocation of radio resources equivalent to the allocation of radio resources in fractional frequency reuse (FFR). FFR is a technology that separates the frequency band of a radio resource to be allocated, for example, between a terminal device far from the base station device located at a cell end and a terminal device close to the base station device located near the cell center, to partially reuse the frequency.

Furthermore, the NMS server 300 may build the RAN slice for each terminal device 100. This allows to allocate radio resources according to the RAN characteristics of each terminal device 100.

Note that the NMS server 300 may collect the position information, the radio state, and the like of the terminal device 100 for the build of the above-mentioned RAN slice.

Moreover, the NMS server 300 may treat a slice built in the core network as it is as the RAN slice without subdividing slices. For example, when a sufficiently subdivided slice has been built on the core network side, the RAN slice is uniquely associated with the slice built in the core network.

<Process 2: Estimation of Needed Radio Resource Amount for Each RAN Slice>

In the process 2, the NMS server 300 estimates (calculates) the needed radio resource amount for each RAN slice in each gNodeB 200.

The NMS server 300 calculates the needed packet size for each slice. The NMS server 300 calculates the needed packet size based on, for example, the guaranteed flow bit rate (GFBR), maximum flow bit rate (MFBR), packet delay budget (PDB), averaging window, length of transmission time interval (TTI), and the like that are set (designated) at the time of build of slices on the core network side (reference document: 3GPP TS.23.501). For example, the needed packet size is calculated by following formula (1).

Packet Size=MFBR (or GFBR)×Length of TTI  Formula (1)

(TTI<PDB, one slot/TTI)

Note that formula (1) is, for example, a formula that does not consider re-sending. Formula (1) is used to calculate the uplink and downlink packet sizes.

Next, the NMS server 300 calculates the amount of radio resources expected for packet transmission. The NMS server 300 determines the modulation and coding scheme (MCS) based on a propagation environment map created in advance. For example, the propagation environment map is generated from past measurement results, simulation results, and the like. Furthermore, in determining the MCS, it may be supposed that there is no interference or that there is an acceptable level of interference.

The NMS server 300 calculates the number of uplink and downlink resource blocks expected for the transmission of the needed packet sizes estimated above, based on the determined MCS. Note that, since the capacity is sometimes insufficient in the actual environment when the number of resource blocks is calculated with MCS on the assumption that there is no interference, the NMS server 300 may calculate the number of resource blocks by adding a predetermined amount of margin.

The NMS server 300 calculates the expected number of resource blocks for each gNodeB 200. The NMS server 300 calculates, for example, the total value of the number of resource blocks expected for the terminal devices 100 connected via radio to the gNodeB 200, as the number of resource blocks expected for the gNodeB 200.

<Process 3: Setting of TDD Frame Configuration>

In the process 3, the NMS server 300 sets the configuration of a time division duplex (TDD) frame. The NMS server 300 determines the configuration of the TDD frame based on the needed resource amount estimated (calculated) in the process 2.

For example, when the same frame configuration is used among the gNodeBs 200 in the same tenant, the NMS server 300 determines the configuration of the TDD frame according to the average load in that tenant, and the load balance of critical cells (for example, a cell with the largest amount of communication, a cell that performs the highest priority traffic transmission, and the like).

Note that, when the TDD frame configuration is fixedly set (change of the TDD frame configuration is not allowed), the NMS server 300 does not have to perform the process 3.

<Process 4: Estimation of Inter-Cell Interference Amount>

In the process 4, the NMS server 300 estimates the amount of interference between two cells (between the gNodeBs 200, between the gNodeB and the terminal device, and between the terminal devices) for each slot. The slots follow the TDD frame configuration determined in the process 3. The NMS server 300 estimates and measures interference between the gNodeB 200 and the terminal device of another cell and the gNodeB 200 and the terminal device of the concerned cell. The amount of interference is estimated using an environment model. The environment model is obtained by modeling the arrangement relationship and propagation environment of cells (the gNodeBs 200 and the terminal devices) and tenants, and is created from layout information on the premises and buildings, or the like. The environment model includes, for example, the position of the terminal device, the antenna beam patterns applied to sending and receiving, the power for sending, and the like. Note that the process 4 is also repeatedly executed as the radio resource allocation process is repeatedly executed. At this time, the environment model to be used is also updated sequentially. With this configuration, the latest environment model can be regularly used, and an estimation result closer to the actual environment may be obtained.

In estimating the amount of interference, the NMS server 300 evaluates the influence of the amount of interference, based on variations in the frame configuration between respective base station devices. Furthermore, the NMS server 300 evaluates the influence of the amount of interference, based on the amount of offset in frame timing (the difference in the frame configuration, the difference in the sending timing, and the like). With this configuration, the NMS server 300 is allowed to evaluate the amount of interference in consideration of a case where, for example, the frame sending timing, the frame length, and the like are different for each base station device and the sending timings of the uplink and downlink signals match.

Figure 7:
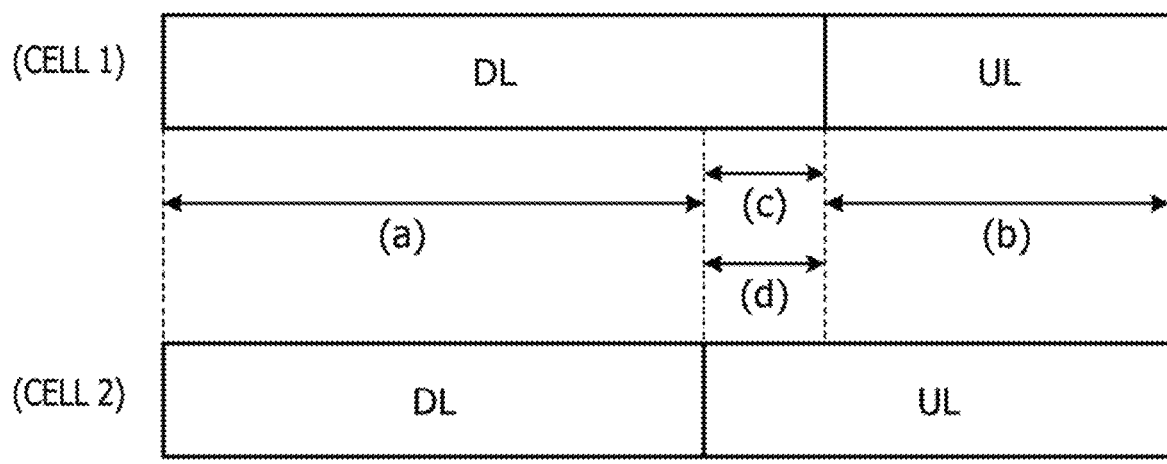
FIG. 7 is a diagram illustrating an example of inter-cell interference measurement timing.

FIG. 7 is a diagram illustrating an example of inter-cell interference measurement timing. FIG. 7 illustrates an example of uplink (UL) and downlink (DL) sending intervals in one slot of each of the cells 1 and 2. Note that FIG. 7 is a diagram when frame synchronization is performed between the cells 1 and 2, but the concept of the measurement interval is similar even when frame synchronization is not performed.

Note that, in the process 4, in addition to the amount of interference on the same channel, the amount of interference on an adjacent channel may also be estimated. In estimating the amount of interference on the adjacent channel, for example, the leakage power from the adjacent channel is considered. Furthermore, for example, when the symbols are synchronized between cells and the same subcarrier spacing is assigned, it is deemed that the influence of the adjacent carrier is small (limited), and accordingly the adjacent carrier interference may not be estimated.

The interval (a) is an interval in which the downlink communication of the cell 1 and the downlink communication of the cell 2 overlap. In the cell 1, this is an interval for measuring the degree of interference due to the radio wave sent by the gNodeB 200 of the adjacent cell 2, against the terminal device that receives the downlink signal (radio wave) in the cell 1. Furthermore, in the cell 2, the above interval is an interval for measuring the degree of interference due to the radio wave sent by the gNodeB 200 of the adjacent cell 1, against the terminal device that receives the downlink signal in the cell 2.

The interval (b) is an interval in which the uplink communication of the cell 1 and the uplink communication of the cell 2 overlap. In the cell 1, this is an interval for measuring the degree of interference due to the radio wave sent by the terminal device that performs communication in the adjacent cell 2, against the reception in the gNodeB 200 of the cell 1. Furthermore, in the cell 2, the above interval is an interval for measuring the degree of interference due to the radio wave sent by the terminal device that performs communication in the adjacent cell 1, against the reception in the gNodeB 200 of the cell 2.

The interval (c) is an interval in which the downlink communication of the cell 1 and the uplink communication of the cell 2 overlap in the cell 1. This is an interval for measuring the degree of interference due to the radio wave sent by the terminal device that performs communication in the adjacent cell 2, against the terminal device that receives the downlink signal in the cell 1. The interval (d) is an interval in which the downlink communication of the cell 1 and the uplink communication of the cell 2 overlap in the cell 2. This is an interval for measuring the degree of interference due to the radio wave sent by the gNodeB 200 of the adjacent cell 1, against the reception in the gNodeB of the cell 2. Note that, when the TD frame configuration is the same between the above two cells, there is no interval (c) or (d), and it is thus not expected to estimate the amount of interference.

Note that the above-mentioned estimation of the inter-cell interference amount may be evaluated using the worst value in the area. This is, for example, a process of estimating or measuring inter-cell interference of a terminal device located at a cell end of each cell, or on the supposition that a terminal device is located at a cell end of each cell.

Figure 8:
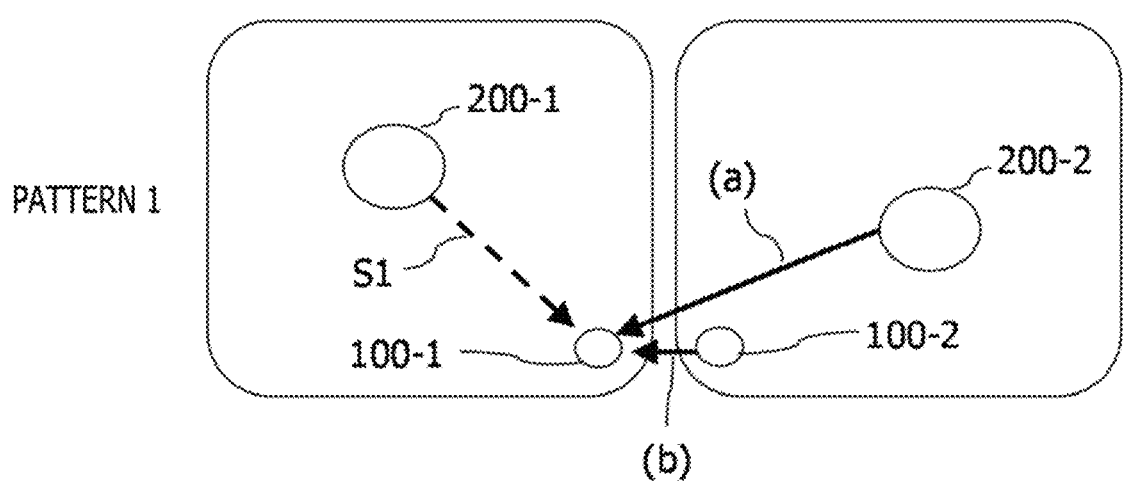
FIG. 8 is a diagram illustrating an example of the positions of terminal devices in area's worst value evaluation.
Figure 8:
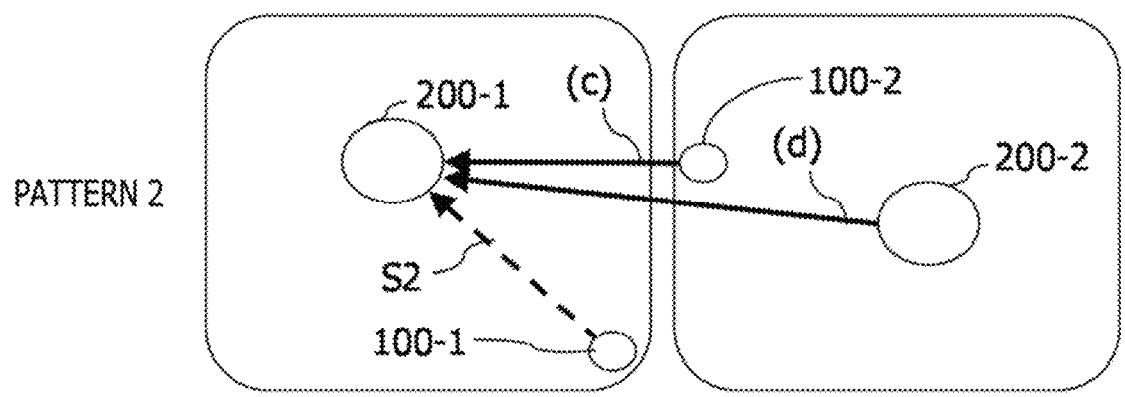

FIG. 8 is a diagram illustrating an example of the positions of terminal devices in area's worst value evaluation.

The pattern 1 is a diagram illustrating an example of a measurement pattern at a timing when the gNodeB 200-1 sends a signal to the terminal device 100-1. The gNodeB 200-1 is communicating with the terminal device 100-1, and is sending a signal S1 in downlink to the terminal device 100-1. The terminal device 100-1 is present, for example, at a cell end of the gNodeB 200-1, which is a position in the vicinity of the adjacent gNodeB 200-2 and the terminal device 100-2 that communicates with the gNodeB 200-2. This means that the terminal device 100-1 is located in a poor environment having a weak strength of a signal received from the gNodeB 200-1 of the same cell, and a strong strength of signals received from the gNodeB 200-2 of another cell and the terminal device 100-2 communicating with the another cell.

Interference at the timing (a) is measured (estimated) by measuring the downlink signal sent by the gNodeB 200-2 at a timing when the terminal device 100-1 receives the signal S1. Furthermore, interference at the timing (c) is measured (estimated) by measuring the uplink signal sent by the terminal device 100-2 at a timing when the terminal device 100-1 receives the signal S1.

The pattern 2 is a diagram illustrating an example of a measurement pattern at a timing when the terminal device 100-1 sends a signal to the gNodeB 200-1. The terminal device 100-1 sends a signal S2 in uplink to the gNodeB 200-1. The terminal device 100-1 is located at a cell end of the gNodeB 200-1, for example. Furthermore, the terminal device 100-2 in an adjacent cell is located in the vicinity of the gNodeB 200-1. This means that the gNodeB 200-1 is located in a poor environment having a weak strength of a signal received from the terminal device 100-1 of the same cell, and a strong strength of a signal received from the terminal device 100-2 of another cell. Note that the positions of the gNodeB 200-1 and the gNodeB 200-2 are assumed to be fixed.

Interference at the timing (b) is measured (estimated) by measuring the uplink signal sent by the terminal device 100-2 at a timing when the gNodeB 200-1 receives the signal S2. Furthermore, interference at the timing (d) is measured (estimated) by measuring the downlink signal sent by the gNodeB 200-2 at a timing when the gNodeB 200-1 receives the signal S2.

<Process 5: Estimation of interference Relationship for Each RAN Slice>

In the process 5, the NMS server 300 estimates the interference relationship between cells for each RAN slice. The NMS server 300 identifies an interfering cell for each cell and each RAN slice, and determines a cell having a large influence.

The NMS server 300 determines the interfering cells for each cell and each RAN slice in the following order of priority (Tiers).

Tier 1: effective downward link interference and upward link interference are estimated from the amounts of interference (a) to (d) on the same channel from another cell, which have been calculated in the process 4, and a cell having even one of the estimated interferences that exceeds an acceptable value set for each slice is specified to be an interfering cell in that slice. The effective downward link interference is the same as the amount of interference (a) if the two cells have the same TDD frame configuration, and if the two cells have different TDD frame configurations, is computed on the basis of the amounts of interference in the intervals (a) and (c) according to the ratio of the intervals (a) and (c). The effective upward link interference is the same as the amount of interference (b) if the two cells have the same TDD frame configuration, and is computed on the basis of the amounts of interference in the intervals (b) and (d) according to the ratio of the intervals (b) and (d) if the two cells have different TDD frame configurations. Adjacent channel interference (interference due to the radio wave not having the same frequency but in an adjacent frequency band) is similarly specified, and when there is interference, the concerned cell is stored as a cell with adjacent channel interference.

Tier 2: when the sum of interferences on the same channel from two cells except for the interfering cell in Tier 1 exceeds the acceptable value, a cell with a higher interference level among these two cells is specified to be an interfering cell. The adjacent channel interference is similarly specified.

Tier 3: when the sum of interferences on the same channel from three cells except for the interfering cells in Tiers 1 and 2 exceeds the acceptable value, a cell with the highest interference level among these three cells is specified to be an interfering cell. The adjacent channel interference is similarly specified.

Note that the order of priority after Tier 4 may be prepared such that a similar process is performed on an increased number of cells.

<Process 6: Allocation of Resources to RAN Slices>

In the process 6, Interference control (allocation of radio resources) is performed for each interfering cell determined in the process 5.

For example, when two cells interfere with each other (when the cell on the other side is specified to be an interfering cell in both of the cells), by allocating a resource that does not coincide with a resource allocated to the cell on the interfering side, to the cell on the interfered side, and setting a resource allocated to the cell on the interfering side as a resource with restrictions in the cell on the interfered side, the NMS server 300 may suppress mutual interference and make the degree of interference equal to or less than a predetermined value. The resource with restrictions is, for example, a resource that is restricted at the time of scheduling (for example, scheduling is prohibited or the like).

The NMS server 300 regards the interfering cell determined in Tier 1 as an interference cell having the highest priority, and performs an allocation method capable of suppressing the interference most. Meanwhile, for the interfering cells determined in Tier 2 or lower, the NMS server 300 suppresses interference by using resources other than the resources that have been allocated in higher Tiers. The resource allocation will be described below.

Figure 9:
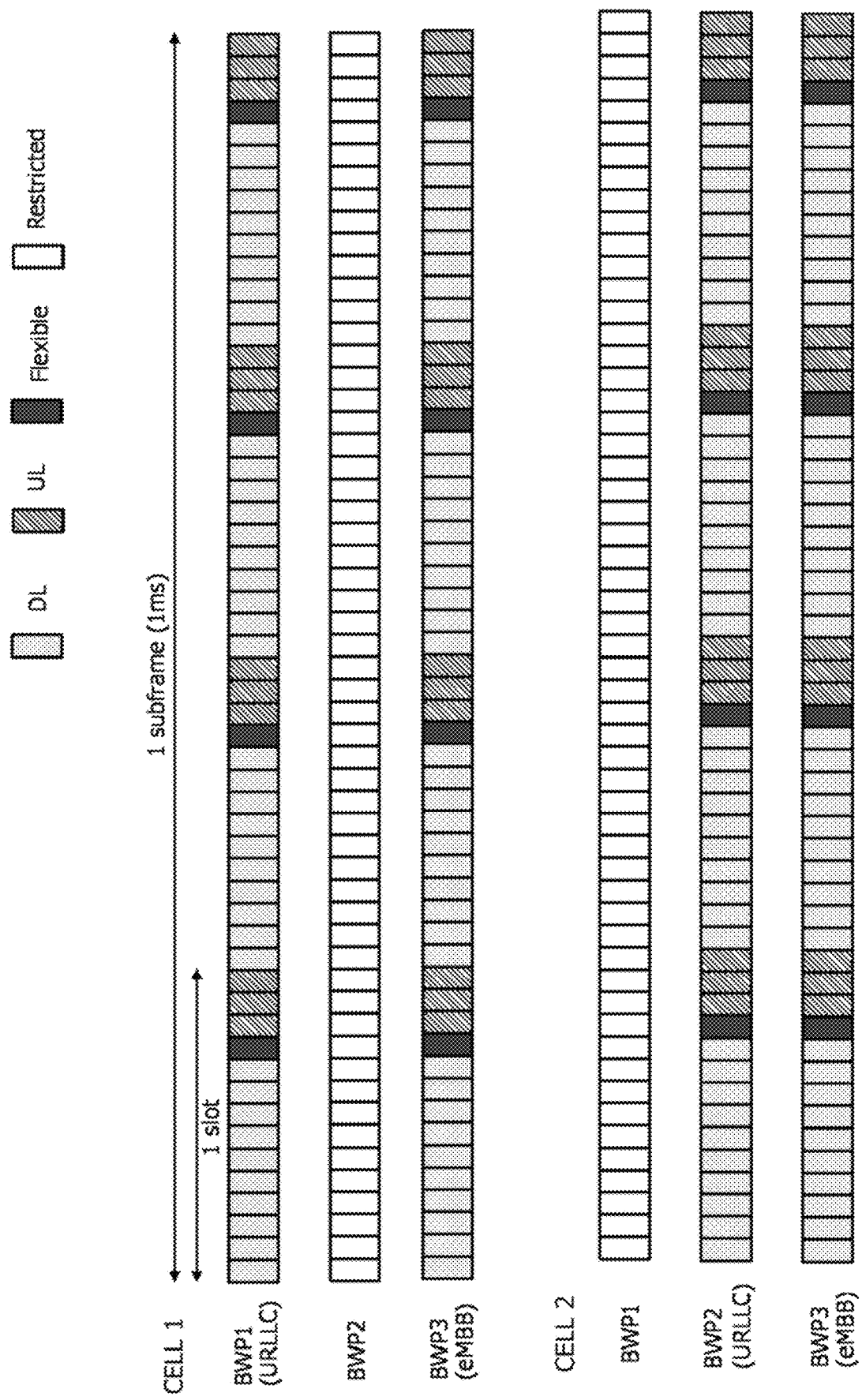
FIG. 9 is a diagram illustrating an example of resource allocation.

FIG. 9 is a diagram illustrating an example of resource allocation. For example, it is assumed that the cells 1 and 2 are frame-synchronized, the subcarrier spacing (SCS) is 60 kHz, the slot length is 0.25 ms, and one subframe is made up of four slots. Note that FIG. 9 is a diagram illustrating an example in which the cells 1 and 2 use the same slot format.

The NMS server 300 allocates a bandwidth part (BWP) 1 in the cell 1 as a resource for the RAN slice having high priority (highly requested slice: for example, URLIC). Then, the NMS server 300 then allocates a BWP 2 in the cell 1 as an unused restricted resource.

Meanwhile, the NMS server 300 allocates the BWP 1 in the cell 2 as an unused restricted resource.

Then, the NMS server 300 then allocates the BWP 2 in the cell 2 as a resource for the RAN slice having high priority.

Moreover, the NMS server 300 allocates a BWP 3 in the cells 1 and 2 as a resource for the RAN slice having low priority (for example, eMBB).

In FIG. 9, the cell 1 uses the BWP 1 as a resource for the high-priority RAN slice, while the cell 2 does not use the BWP 1 (or treats the BWP 1 as a restricted resource; the same applies hereafter). Furthermore, in FIG. 9, the cell 2 uses the BWP 2 as a resource for the high-priority RAN slice, while the cell 1 does not use the BWP 2. In this manner, by allocating a predetermined frequency band as a resource for the high-priority RAN slice for each cell, interference with the RAN slice having high priority between cells may be suppressed.

Figure 10:
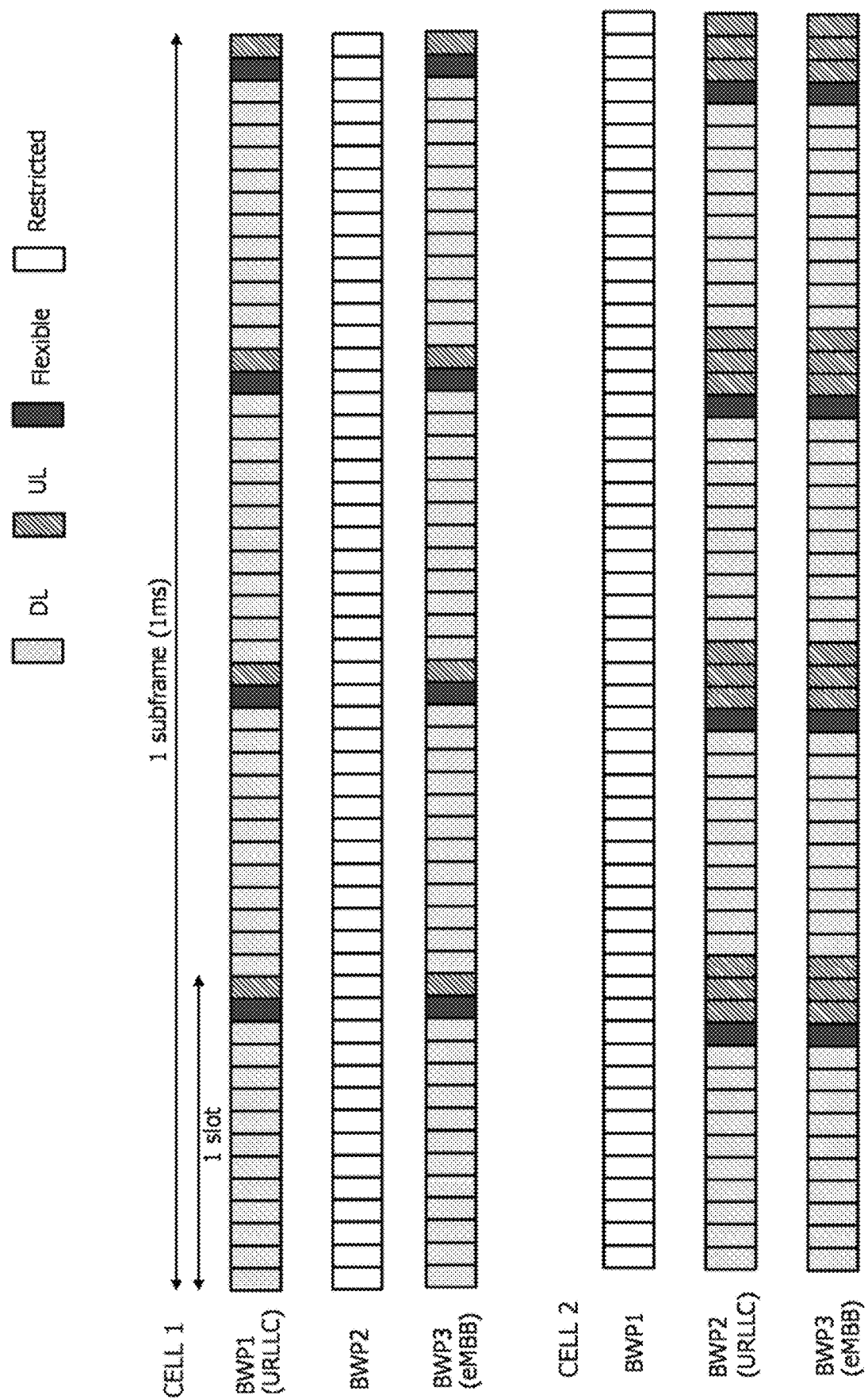
FIG. 10 is a diagram illustrating an example of resource allocation.

FIG. 10 is a diagram illustrating an example of resource allocation. In FIG. 10, the BWPs are allocated to the respective slices equally to FIG. 9, but the slot formats are different between the cells 1 and 2. Different slot formats may be used between cells as long as appropriate control for adjacent channel interference is allowed.

Figure 11:
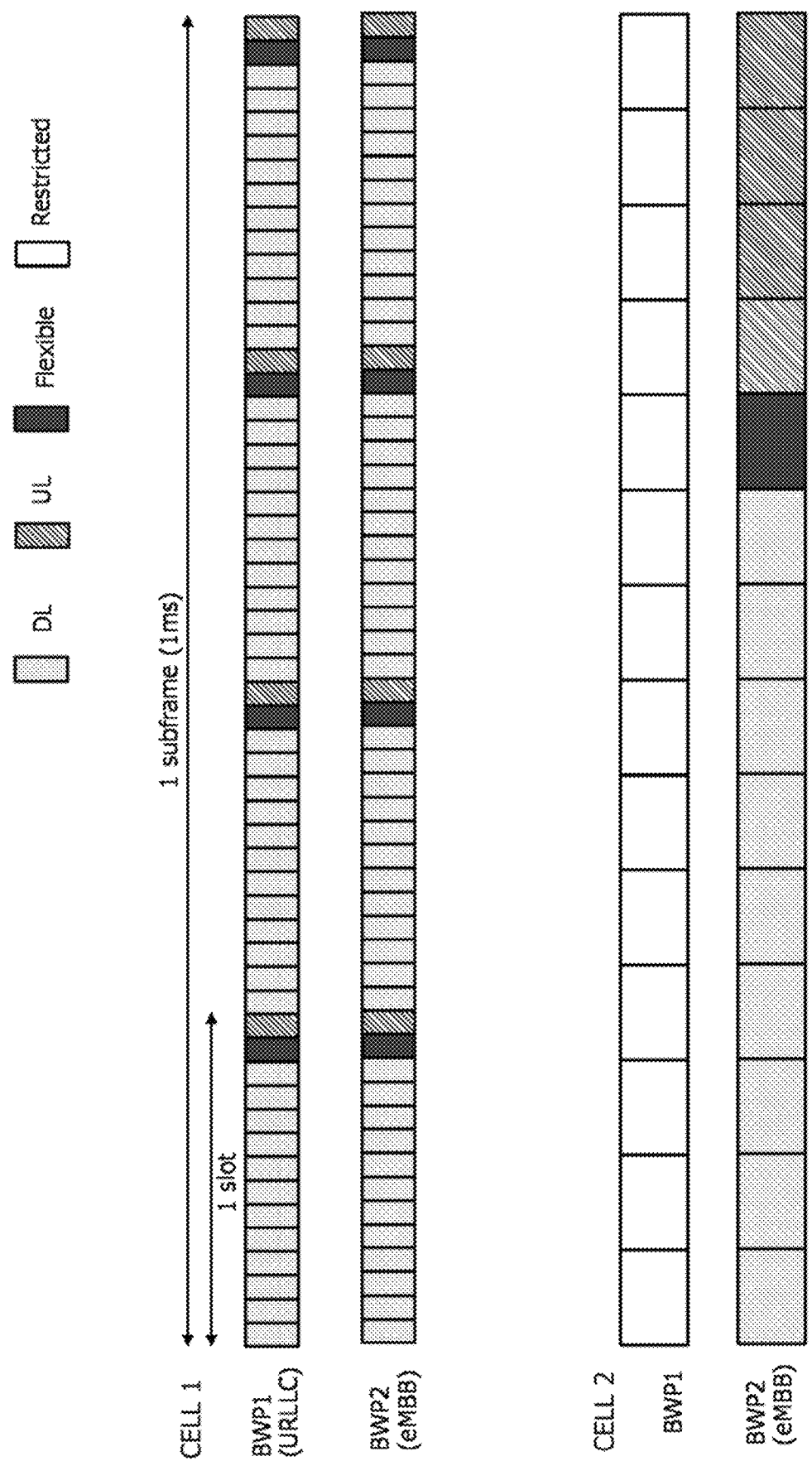
FIG. 11 is a diagram illustrating an example of resource allocation.

FIG. 11 is a diagram illustrating an example of resource allocation. As Illustrated in FIG. 11, the NMS server 300 suppresses interference by assigning the BWP 1 as a resource for the high-priority RAN slice in the cell 1 and assigning the BWP 1 as an unused resource in the cell 2. In this manner, when one cell (the cell 2 in this case) does not use the high-priority RAN slice, a resource for the high-priority RAN slice does not have to be allocated to the one cell. Furthermore, when resources for the RAN slices are allocated by splitting the frequency band in this manner, the slot length may be different for each cell as illustrated in FIG. 11.

Second Embodiment

In a second embodiment, the process 1 (the build of the RAN slice) and the process 2 (the estimation of the needed radio resource amount for each RAN slice) in the radio resource allocation process S1000 will be described.

The NMS server 300 is expected to prepare appropriate RAN slices for pieces of traffic having different radio transmission line qualities and requested qualities for each user, and allocate an appropriate radio resource to each RAN slice. For example, the index of the requested quality includes an error rate such as a block error rate (BLER), an acceptable latency time, a location rate indicating the percentage of the amount of space meeting the request to a predetermined space, and the like.

A high-quality RAN slice has to be prepared in order to allocate an appropriate RAN slice to a user having a high requested quality. However, if a radio resource with a margin larger than expected is allocated to this RAN slice, the resource utilization efficiency decreases in some cases.

The second embodiment provides the process 1 and the process 2 that are applied to a user having a high requested quality and suppress a decrease in resource utilization efficiency.

<Process 1: Build of RAN Slice>

In the build of the RAN slice, for example, there is a technique that compares average radio quality per user (for example, an average signal-to-interference-plus-noise ratio (SINR)) with a threshold value defined for each RAN slice to select the RAN slice. In this technique, when the radio quality is substantially poorer than the average value, ensuring the requested quality of the user fails in some cases, although the frequency of occurrence is low.

In the build of the RAN slice of the second embodiment, by estimating the probability distribution of radio qualities for each user and referring to the shape of this distribution, a RAN slice that can meet an exceptionally high needed quality (a quality that does not accept even deterioration of quality that occurs rarely) of a certain piece of traffic is built and selected. The radio quality includes, for example, the radio quality between the base station device and the terminal device, the radio quality between the base station devices, and the radio quality between the terminal devices.

Figure 12:
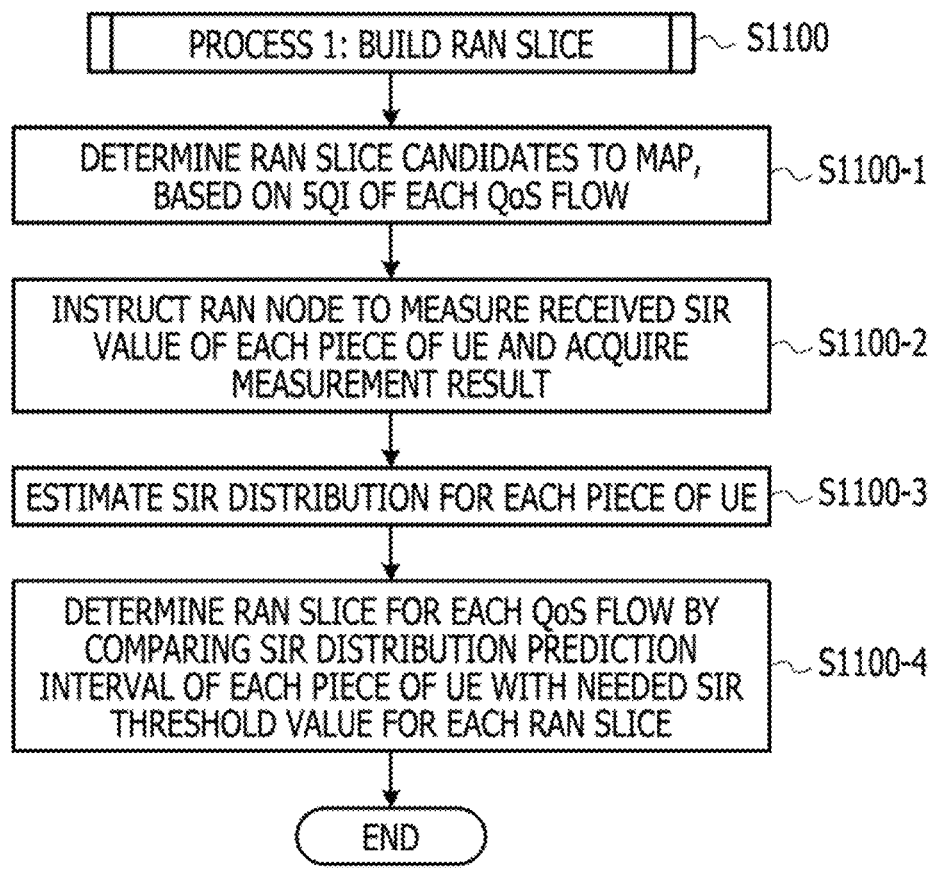
FIG. 12 is a diagram illustrating an example of a processing flowchart of a process 1 in a second embodiment.

FIG. 12 is a diagram illustrating an example of a processing flowchart of the process 1 in the second embodiment. The NMS server 300 determines RAN slice candidates to map, based on the 5G QoS identifier (5QI) of each QoS flow (S1100-1). For example, 5QI includes indexes related to QoS characteristics, such as the priority level, packet delay budget, packet error rate, average window size, and maximum burst amount of data.

The NMS server 300 instructs a RAN node (for example, the gNodeB, the terminal device, and the like) to measure the received signal-to-interfere ratio (SIR) value of the user equipment (UE), and acquires the measurement result (S1100-2).

Then, the NMS server 300 estimates the distribution of SIR for each piece of UE (terminal device) (S1100-3). As an estimation method, for example, a histogram (probability distribution) is calculated when measured values are sufficiently obtained. Furthermore, as an estimation method, for example, when measured values are not sufficiently obtained, Bayesian estimation is applied and a histogram is calculated.

Since it is difficult to estimate the tail parts of the distribution from the histogram with high accuracy, the NMS server 300 estimates the variance (variance value) of Bayesian Inference with the likelihood distribution as a normal distribution, or estimates the Bayesian prediction interval. The distribution for each piece of UE can be approximated by a single lognormal distribution and can be worked out analytically. Since L3 filtering is applied to the measured value reported from the UE, the NMS server 300 corrects the estimated variance value according to the filter coefficient. For example, the NMS server 300 corrects the estimated variance value according to a coefficient (filter coefficient) used in a smoothing process used on the measured value. L3 filtering is, for example, filtering carried out on the measurement result in the terminal device. The NMS server 300 is allowed to create a more precise probability distribution by correcting the probability distribution in consideration of the coefficient used for filtering.

The NMS server 300 determines the RAN slice for each QoS flow by comparing the SIR distribution prediction interval of the UE with a needed SIR threshold value for each RAN slice (S1100-4), and ends the process.

<Process 2: Estimation of Needed Radio Resource Amount for Each RAN Slice>

The NMS server 300 determines (estimates) the amount of radio resources actually allocated to each RAN slice such that the above-mentioned requested quality of traffic is met.

The needed packet size indicated by formula (1) in the first embodiment represents a size expected for transmission by one user. Since packets of a plurality of users are multiplexed in a slice, the needed transmission rate of the slice after multiplexing is determined in order to determine the needed size of the slice.

As a method for this process, there is a method of calculating the needed packet size for all users belonging to one slice and taking a value obtained by adding the calculation results as the needed transmission rate of the slice. In this method, since all users are assessed at the maximum rate prescribed by MFBR assuming a case where all users are multiplexed at the same time, excessive radio resource allocation sometimes happens.

Thus, in the second embodiment, the NMS server 300 determines the minimum expected slice transmission rate that meets the requested quality of each piece of traffic in consideration of the characteristics of each piece of traffic (for example, the packet arrival interval, arrival packet size, and maximum acceptable latency), the number of users to be multiplexed, and the like. For example, the NMS server 300 refers to the shape of the SINR probability density distribution to extract the minimum SINR value that satisfies the exceptionally high requested quality, and determines the amount of radio resources that meets the needed latency characteristics of the accommodated traffic, based on the minimum SINR value.

The NMS server 300 determines the amount of radio resources to be allocated to the RAN slice based on, for example, the minimum transmittable rate of the RAN slice and attribute information on pieces of traffic (UE) to be multiplexed on the RAN slice. The attribute information is, for example, the packet size. Furthermore, the attribute information also includes a data rate, an acceptable latency time, and the like.

Figure 13:
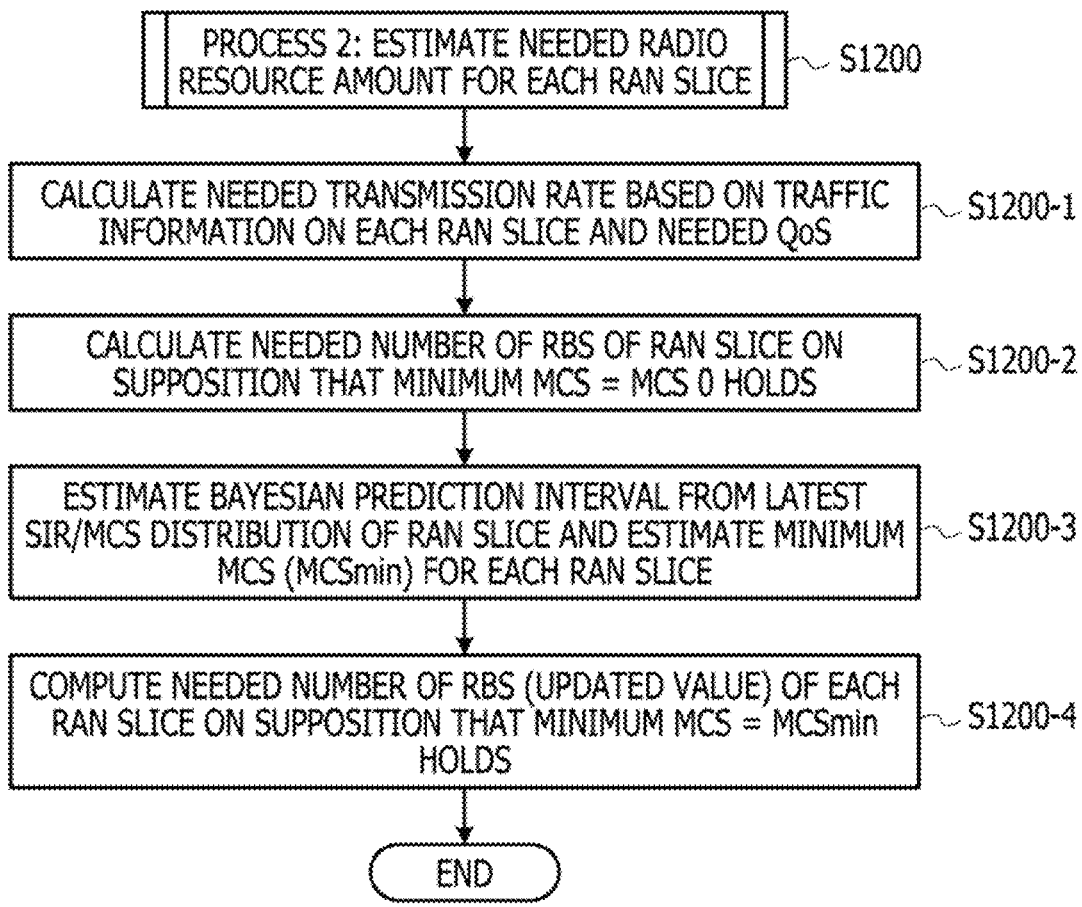
FIG. 13 is a diagram illustrating an example of a processing flowchart of a process 2 in the second embodiment.

FIG. 13 is a diagram illustrating an example of a processing flowchart of the process 2 in the second embodiment. The NMS server 300 calculates the needed transmission rate by stochastic network calculus (SNC), based on traffic information on each RAN slice and the needed QoS (acceptable amount of latency) (S1200-1).

The NMS server 300 calculates the needed number of resource blocks (RBs) (initial value) for each RAN slice on the supposition that the minimum MCS=MCS 0 (initial value) holds (S1200-2). Note that the process S1200-2 may not be executed when the requested reliability is not high (when the requested reliability is lower than a predetermined value) or when sufficient information regarding the SIR/MCS distribution is obtained beforehand.

The NMS server 300 estimates the Bayesian prediction interval based on the latest SIR/MCS distribution of each RAN slice, and estimates the minimum MCS (MCSmin) for each RAN slice (S1200-3). As an estimation method, there is also a method using Markov Chain Monte Carlo (MCMC) or a particle filter, but the computation load will be large because the SIR distribution of the RAN slice will have a mixed model. Thus, the NMS server 300 makes estimation from the individual SIR distribution of the UE constituting the slice.

The NMS server 300 computes (performs data assimilation on) the needed number of RBs (updated value) of each RAN slice on the supposition that the minimum MCS (MCSmin) estimated above is given (S1200-4), and ends the process.

In the second embodiment, the minimum transmittable rate is estimated (calculated) from the probability distribution to relax the excessive allocation of radio resources with a margin larger than expected, and the requested quality of the user may be ensured even when the radio quality is substantially poorer than the average value.

OTHER EMBODIMENTS

The allocation of radio resources indicated in the first and second embodiments is an example. Accordingly, for example, the slot configuration and the subframe configuration may be changed. Furthermore, the radio resource allocation patterns indicated in the first and second embodiments may be combined with each other.

In addition, the apportionment between uplink allocation and downlink allocation and the like may be changed. Besides, in the radio resource allocation process, some processes may not be performed in some cases. For example, when the TDD frame configuration is fixed, the process 3 may not be performed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control device in a communication system that includes a plurality of base station devices and terminal devices connected via radio to the base station devices, comprising:
a memory; and
a processor coupled to the memory and configured to:
calculate a needed radio resource amount of each of a plurality of slices classified based on requested quality;
estimate, for each of the plurality of base station devices, an amount of interference between the base station devices, an amount of interference between the base station devices and the terminal devices, and an amount of interference between the terminal devices, in each of the plurality of slices;
allocate, in radio resources of a first base station device, a first resource for a first slice, a second resource for a second slice that has higher requested quality than requested quality of the first slice, and a restricted resource to which restrictions are imposed on use, based on a result of the estimation;
allocate a resource other than the second resource and the restricted resource as the first resource;
allocate a resource that is allocated in a second base station device and has influence on interference with the second slice, as the restricted resource;
build a slice such that the requested quality is met, based on probability distribution of radio quality between the base station devices and the terminal devices;
calculate each of packet sizes of pieces of traffic to be multiplexed on each of the slices; and
determine an amount of radio resources to be allocated to each of the slices, based on a minimum transmittable rate of each of the slices and the packet sizes.

2. The control device according to claim 1, wherein in allocating a resource for the first slice in the first base station device, a resource different from the resource that is allocated in the second base station device and has influence on interference with the second slice is allocated.

3. The control device according to claim 1, wherein the plurality of slices includes slices obtained by further classifying constituent slices configured by a core network, according to a radio environment.

4. The control device according to claim 1, wherein in estimating the amount of interference, the processor estimates interference that occurs when each of the base station devices uses the same channel.

5. The control device according to claim 4, wherein in estimating the amount of interference, the processor further estimates the interference that occurs when each of the base station devices uses adjacent channels.

6. The control device according to claim 1, wherein in estimating the amount of interference, the processor estimates interference that occurs when any of the terminal devices is located near an end part of a cell configured by one of the base station devices.

7. The control device according to claim 1, wherein in estimating the amount of interference, the estimation unit evaluates influence of the amount of interference, based on variations in a frame configuration for each of the base station devices or an amount of offset in frame timing.

8. The control device according to claim 1, wherein the processor estimates a minimum transmittable rate that meets the requested quality for the slices from distribution of transmission rates of the slices.

9. The control device according to claim 1, wherein the processor collects a measured value of radio quality from at least one of each of the base station devices and each of the terminal devices and, corrects the estimated probability distribution, according to a coefficient used for smoothing on the measured value.

10. A control method for a control device of a communication system that includes a plurality of base station devices, terminal devices connected via radio to the base station devices, and the control device that controls the base station devices, the control method comprising:
calculating a needed radio resource amount of each of a plurality of slices classified based on requested quality, and estimating, for each of the plurality of base station devices, an amount of interference between the base station devices, an amount of interference between the base station devices and the terminal devices, and an amount of interference between the terminal devices, in each of the plurality of slices;
allocating, in radio resources of a first base station device, a first resource for a first slice, a second resource for a second slice that has higher requested quality than requested quality of the first slice, and a restricted resource to which restrictions are imposed on use, based on a result of the estimation;
building a slice such that the requested quality is met, based on probability distribution of radio quality between the base station devices and the terminal devices;
calculating each of packet sizes of pieces of traffic to be multiplexed on each of the slices; and
determining an amount of radio resources to be allocated to each of the slices, based on a minimum transmittable rate of each of the slices and the packet sizes, and
in the allocating, a resource other than the second resource and the restricted resource is allocated as the first resource, and a resource that is allocated in a second base station device and has influence on interference with the second slice is allocated as the restricted resource.

* * * * *